US012623226B2

(12) United States Patent
Bautista

(10) Patent No.: US 12,623,226 B2

(45) Date of Patent: May 12, 2026

(54) PCR SAMPLE BLOCK TEMPERATURE UNIFORMITY

(71) Applicant: Bio-Rad Laboratories, Inc., Hercules, CA (US)

(72) Inventor: Garret Bautista, El Cerrito, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 869 days.

(21) Appl. No.: 17/343,461

(22) Filed: Jun. 9, 2021

(65) Prior Publication Data

US 2021/0387200 A1 Dec. 16, 2021

Related U.S. Application Data

(60) Provisional application No. 63/039,090, filed on Jun. 15, 2020.

(51) Int. Cl.

*C12Q 1/68* (2018.01)

*B01L 7/00* (2006.01)

(52) U.S. Cl.

CPC ........... *B01L 7/52* (2013.01); *B01L 2300/046* (2013.01); *B01L 2300/0663* (2013.01); *B01L 2300/123* (2013.01); *B01L 2300/16* (2013.01); *B01L 2300/1833* (2013.01)

(58) Field of Classification Search

None

See application file for complete search history.

(56) References Cited

U.S. PATENT DOCUMENTS 5,616,301 A 4/1997 Moser et al.
6,337,435 B1 1/2002 Chu et al.
6,426,215 B1 * 7/2002 Sandell ............... B01L 3/50851 435/305.3
RE39,566 E * 4/2007 Elsener ..................... B01L 7/52 219/385
7,727,479 B2 6/2010 Heimberg et al.
8,088,573 B2 * 1/2012 Heaney ................... B01L 9/527 435/6.12

(Continued)

FOREIGN PATENT DOCUMENTS

EP 1202805 A1 * 5/2002 ................ B01L 7/52
EP 1452608 A1 * 9/2004 .......... B01L 3/50851

(Continued)

OTHER PUBLICATIONS

Chou et al. (Microelec Eng, 2002, 61-62:921-925) (Year: 2002).*

(Continued)

*Primary Examiner* — Stephanie K Mummert

(74) *Attorney, Agent, or Firm* — Kilpatrick Townsend and Stockton LLP

(57) ABSTRACT

A sample plate for a thermal cycler suitable for performing a polymerase chain reaction (PCR) procedure includes a base plate and a number of reaction vessels extending upward from the base plate. The sample plate further includes a vertical wall surrounding an outer perimeter defined by the reaction vessels. The vertical wall can be a continuation vertical wall, an intermittent vertical wall, or a perforated vertical wall. The intermittent vertical wall can include a plurality of wall portions, each of which plurality of wall portions is separated from other wall portions via a plurality of gaps.

21 Claims, 8 Drawing Sheets

(56) References Cited

U.S. PATENT DOCUMENTS

| | | | | |
|---|---|---|---|---|
| 11,351,551 | B2 * | 6/2022 | Joad | B01L 3/5085 |
| 2006/0065652 | A1 * | 3/2006 | Brown | B01L 7/52<br>219/478 |
| 2008/0003149 | A1 | 1/2008 | Banerji | |
| 2008/0245787 | A1 * | 10/2008 | Lambert | B01L 3/5085<br>219/745 |
| 2008/0274511 | A1 | 11/2008 | Tan et al. | |
| 2009/0283512 | A1 * | 11/2009 | Huhn | G01N 21/253<br>219/522 |
| 2013/0078713 | A1 | 3/2013 | Atwood et al. | |
| 2017/0173586 | A1 * | 6/2017 | Tan | B01L 7/52 |
| 2021/0245161 | A1 * | 8/2021 | Nie | B01L 7/52 |

FOREIGN PATENT DOCUMENTS

| | | | |
|---|---|---|---|
| EP | 1202805 | B1 | 12/2004 |
| EP | 1452608 | B1 | 9/2007 |
| WO | 2004/018105 | A1 | 3/2004 |

OTHER PUBLICATIONS

International Search Report and Written Opinion from PCT/US2021/036658 mailed Sep. 15, 2021; 10 pages.
Extended European Search Report in EP Appln. 21826931.4 mailed Jun. 7, 2024; 11 pages.

* cited by examiner

PCR SAMPLE BLOCK TEMPERATURE UNIFORMITY

CROSS-REFERENCES TO RELATED APPLICATIONS

This application claims the benefit of U.S. Provisional Application No. 63/039,090, entitled "PCR SAMPLE BLOCK TEMPERATURE UNIFORMITY", and filed on Jun. 15, 2020, the entirety of which is hereby incorporated by reference herein.

BACKGROUND

The polymerase chain reaction (PCR) provides a way of replicating or "amplifying" small quantities of DNA, so that sufficient quantities are available for further study. Millions or billions of copies of a DNA sample can be made in a few hours. Since its invention in 1983, PCR has revolutionized the field of molecular biology, and finds broad application in disease diagnosis, forensics, research, and other fields.

To perform PCR, a reagent mixture is typically placed in reaction vessels in small quantities, for example 10-200 μL per reaction vessel. While only a single reaction vessel may be used, often an array of reaction vessels is used, including dozens or even hundreds of vessels. The reagent mixture may include the DNA to be replicated, a DNA polymerase, two DNA primers complementary to the ends of the DNA target strand, a buffer solution, and other materials. After some initialization steps, the reagent mixture is subjected to repeated temperature cycling. For example, in each thermal cycle, the reagent mixture is held for a first period of time at about 94-96° C. to "melt" the DNA into two single-stranded DNA molecules, and then held for a second period of time at a temperature of about 68° C. to anneal the primers to each of the single-stranded DNA templates, and then held for a third period of time at a temperature of about 72° C. to "elongate" the DNA strands, creating new double-stranded DNA molecules. Each thermal cycle nominally doubles the amount of the target DNA present.

In a typical PCR procedure, about 20-40 thermal cycles may be performed, taking a total of a few minutes to a few hours. Devices have been developed for performing the thermal cycling automatically, and are often based on the thermoelectric effect.

Ideally, the various reaction vessels undergo the as nearly the same temperature profiles as possible. However, prior system have not achieved desired levels of temperature uniformity.

BRIEF SUMMARY

According to one aspect, a sample plate for a thermal cycler comprises a base plate and a number of reaction vessels extending upward from the base plate. The reaction vessels define an outer perimeter, and the sample plate further comprises a vertical wall surrounding the reaction vessels.

According to another aspect, a thermal cycling device for performing a polymerase chain reaction (PCR) procedure comprises a heat sink and one or more thermoelectric devices in thermal contact with the heat sink. The thermoelectric devices are configured to produce a temperature differential in response to electric currents passing through the thermoelectric devices. The thermal cycling device further comprises a sample plate in thermal contact with the one or more thermoelectric devices. The sample plate comprises a base plate and a number of reaction vessels extending upward from the base plate. The reaction vessels define an outer perimeter, and the sample plate further comprises a vertical wall surrounding the outer perimeter of the reaction vessels.

According to another aspect, a method comprises providing the PCR thermal cycler, receiving a reagent mixture into the reaction vessels, and controlling the thermoelectric devices to bring the sample plate to a nominal temperature of 95° C. When the sample block is held at a nominal temperature of 95° C., the variation of temperature between the reaction vessels of the sample plate reaches a value of less than 1° C.

DETAILED DESCRIPTION

Embodiments of the invention provide improved temperature uniformity among reaction vessels in a PCR thermal cycler.

Figure 1:
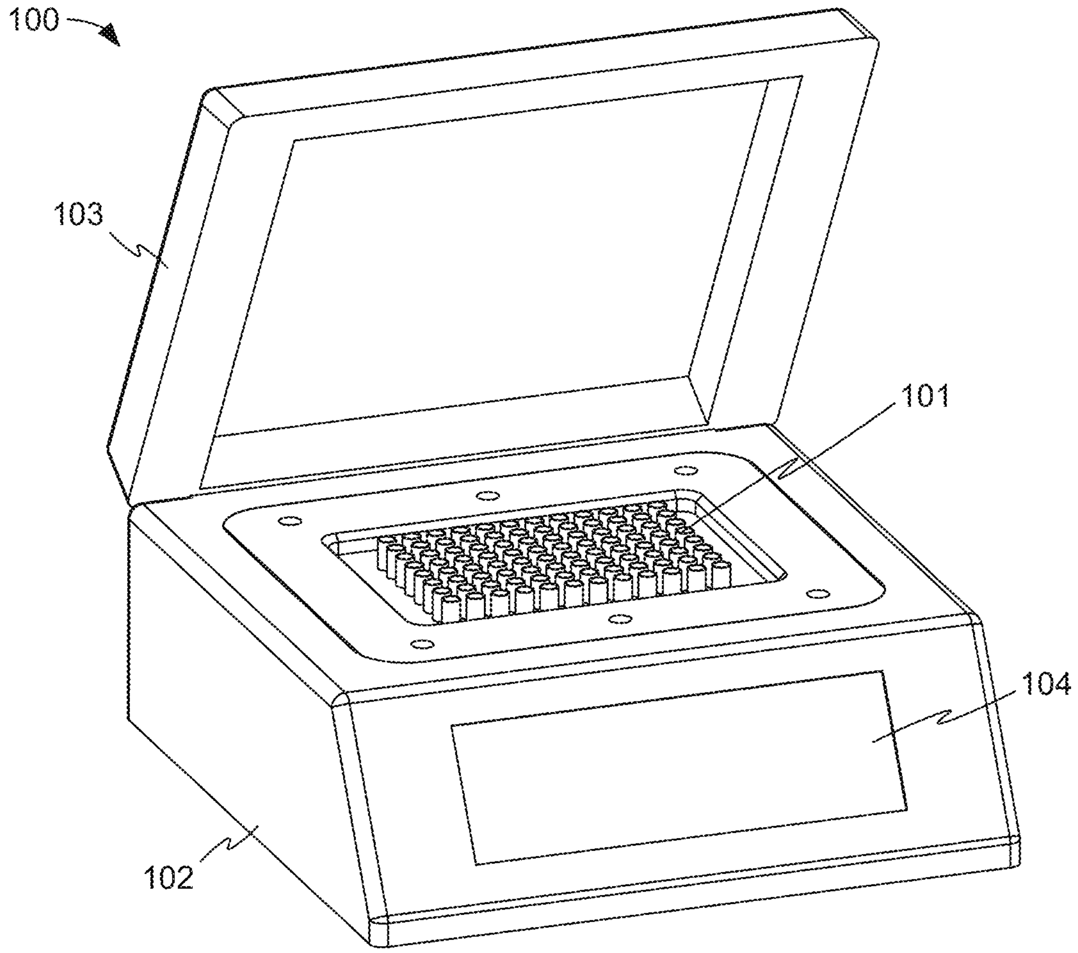
FIG. 1 shows a simplified schematic drawing of a PCR thermal cycler.

FIG. 1 illustrates a simplified schematic drawing of a generic PCR thermal cycler 100. An array of reaction vessels 101 is housed in an enclosure 102. A movable lid 103 is provided for covering reaction vessels 101 during a PCR procedure. Lid 103 may be heated during the procedure, for example to about 98° C., to reduce or prevent condensation inside thermal cycler 100. Thermal cycler 100 may include various controls and indicators, for example a touch screen display 104.

Figure 2:
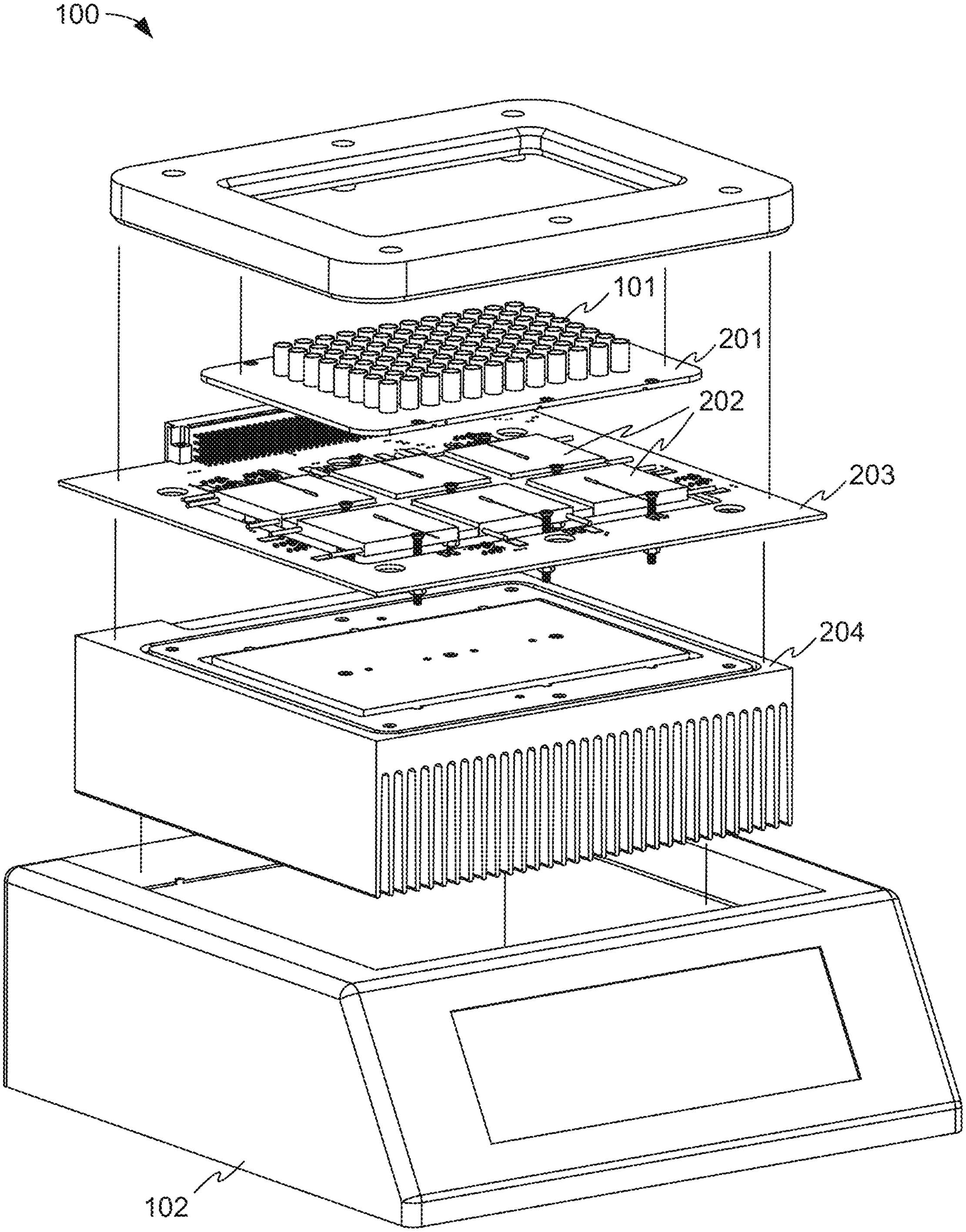
FIG. 2 shows an exploded view of some components of the PCR thermal cycler of FIG. 1.

FIG. 2 shows an exploded view of some components of PCR thermal cycler 100, showing additional details. Reaction vessels 101 are integrally formed of a thermally conductive material into a sample block 201. A number of thermoelectric devices 202 are electrically connected to a printed circuit board 203, and thermally coupled to sample block 201 and a heat sink 204.

Figure 3:
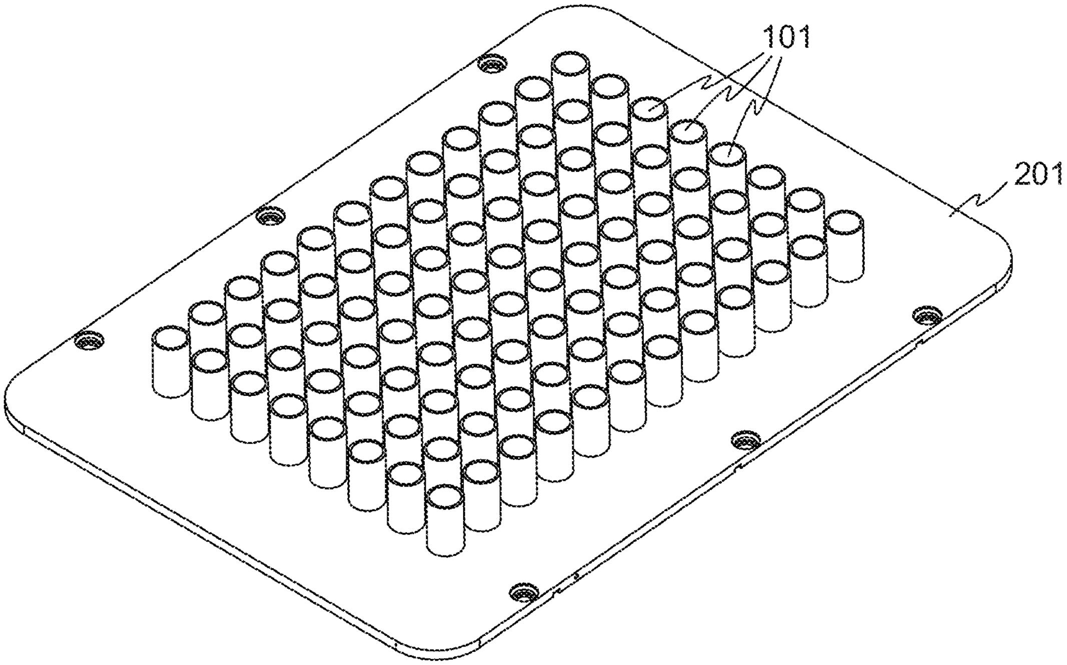
FIG. 3 shows sample block of the thermal cycler of FIG. 1, including reaction vessels.

FIG. 3 shows sample block 201, including reaction vessels 101, in more detail.

In operation, a controller, for example implemented on printed circuit board 203, drives thermoelectric devices 202 with varying electrical currents, to implement the thermal cycles of the PCR, heating sample block 201 to different temperatures for the proper times as needed for performing the PCR procedure. In a particular experiment, all of the reaction vessels 101 may contain the same reagent mixture, or different reaction vessels may contain different reagent mixtures, so that two or more different assays can be performed in parallel.

Although thermoelectric devices 202 may be relatively evenly distributed below sample block 201, and sample block 201 is made of a thermally conductive material such as aluminum, the temperatures of reaction vessels 101 may still differ from each other to some degree.

Figure 4:
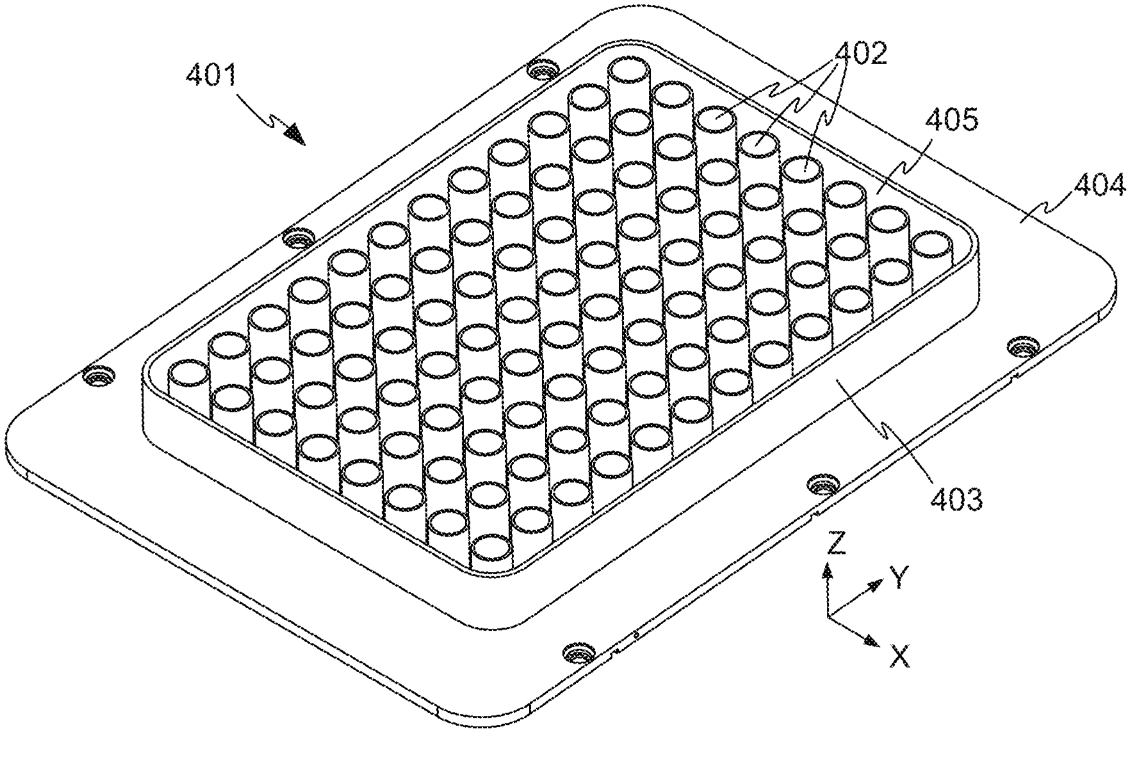
FIG. 4 shows a sample block in accordance with embodiments of the invention.

FIG. 4 shows a sample block 401 in accordance with embodiments of the invention. Sample block 401 includes reaction vessels 402, similar to reaction vessels 101 discussed above, extending upward from a base plate 404. Sample block 401 also includes a vertical wall 403 surrounding reaction vessels 402. Example sample block 401 includes a base plate 404 measuring about 106×148 millimeters in the X and Y directions. Sample block 401 includes 96 reaction vessels 402, each about 6.3 mm in outside diameter, about 5.5 mm in inside diameter at the top end, and tapering to an inner diameter of about 2.4 mm at the bottom. Preferably, reaction vessels 402 are spaced 9 mm apart center-to-center in both the X and Y directions, similar to sample plates commonly used in microfluidic applications, although this is not a requirement. Reaction vessels 402 may be about 10.4 mm tall, but again other dimensions may be used. In other embodiments, any workable number of reaction vessels may be used, in any workable dimensions. For example, more or fewer reaction vessels may be present. In some embodiments, up to 384 of more reaction vessels may be present, smaller than reaction vessels 402, and space 4.5 mm apart in the X and Y directions.

In the embodiment of FIG. 4, vertical wall 403 is about 10.4 mm high, as measured from the top surface of base plate 404 of sample block 401, and inner surface 405 of vertical wall 403 is positioned about 3.0 mm away from the outer perimeter of the reaction vessels 402, as defined by the outer surfaces of the outermost rows and columns of reaction vessels 402. While wall 403 is the same height as reaction vessels 402 in the example of FIG. 4, this is not a requirement, and a wall in accordance with embodiments of the invention may be taller or shorter than the reaction vessels. Vertical wall 403 may be about 0.5 to 3.0 mm thick, or another workable thickness. In the example of FIG. 4, vertical wall is 1.0 mm thick, and encloses an area about 75×111 mm in the X and Y directions. In other embodiments, these dimensions may vary.

Sample block 401 is preferably a monolithic piece of thermally conductive material, such as aluminum or another suitable material. Sample block 401 may be made by any suitable process, for example die casting, sintering, 3D printing, machining, or the like, or by a combination of processes.

Outer wall 403 serves to improve the temperature uniformity of reaction vessels 402 during a PCR procedure. In the absence of vertical wall 403, it is thought that the outer rows and columns of reaction vessels have more opportunity for outward heat flow, whether by radiation to the surrounding structure of the PCR cycler device in which the sample block is placed, by convection due to small air currents in the space surrounding the sample block, or by conduction outward through base plate 404. For example, the natural convection coefficients on the surfaces of the inner wells may be between 0 and 1 $W/m^2$-K, while the same coefficients on the outer surfaces of the perimeter wells may be 5-10 $W/m^2$-K. Vertical wall 403 may affect any or all of these heat flow mechanisms.

For example, perimeter wall 403 will be passively heated and cooled along with the wells on the sample block. The heated wall being in close proximity to the outer wells reduces the natural convection and its associated heat losses on the wells and the convection coefficients are similar to those around the inner wells. In addition, the wall acts as a physical barrier to airflow that would cool the perimeter wells. On any sample block, air surrounding the block is cooler than the air in close proximity to the block. The difference in temperature creates airflow around the outer perimeter wells. Wall 403 acts as a physical barrier to airflow around the perimeter wells and improves temperature uniformity.

Figure 5:
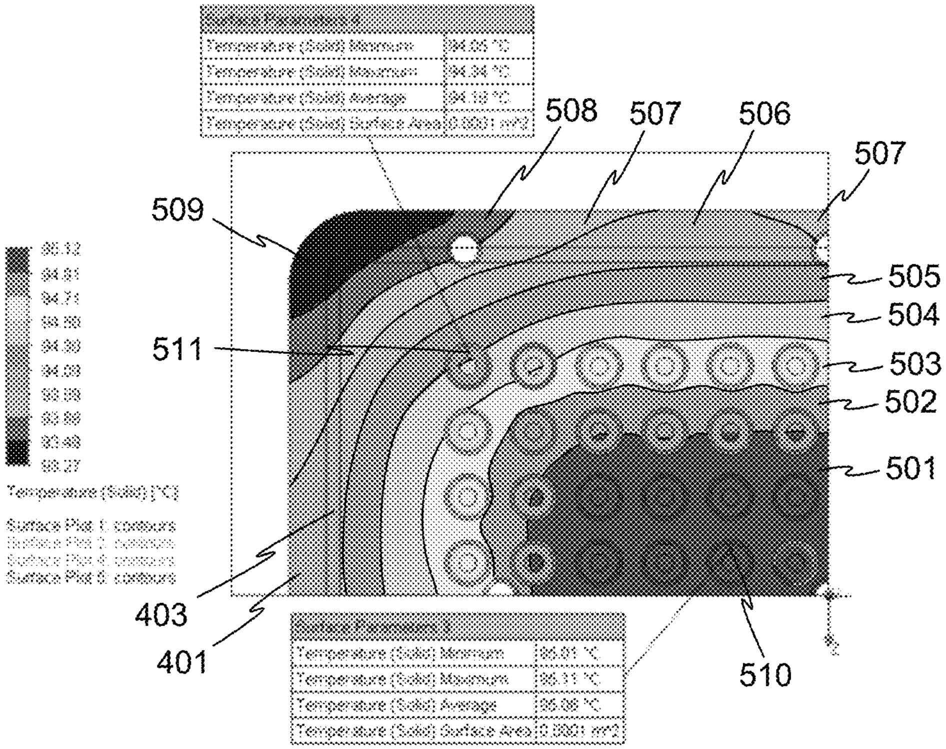
FIG. 5 shows thermal modeling results of a sample block without a vertical wall.
Figure 6:
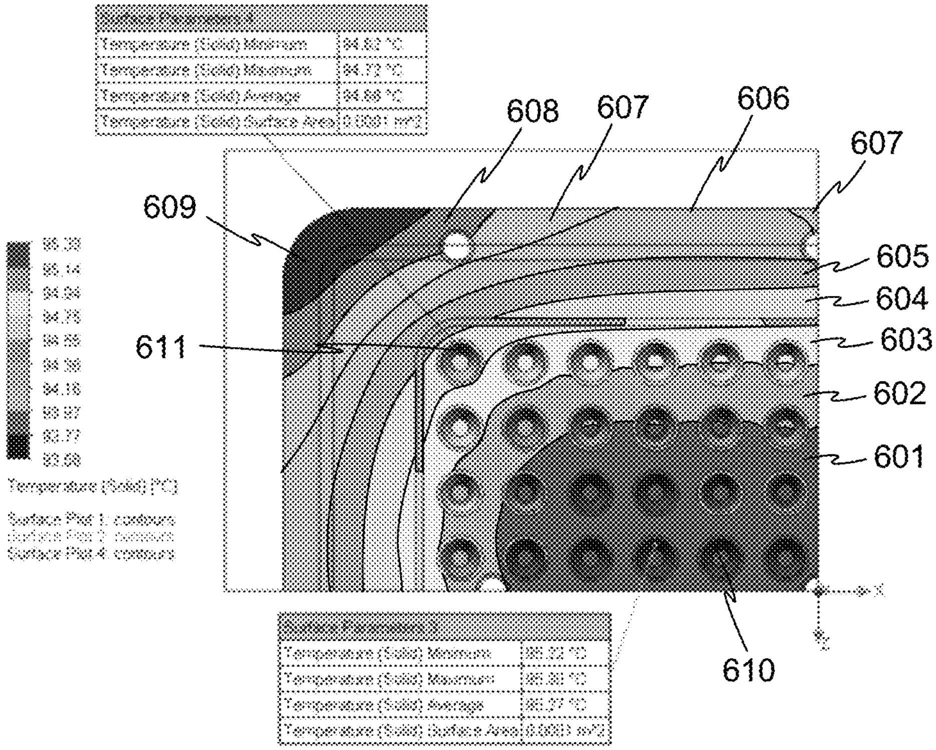
FIG. 6 shows thermal modeling results of a sample block with a vertical wall, in accordance with embodiments of the invention.

FIGS. 5 and 6 show the results of a thermal modeling analysis of the performance of a sample block with and without vertical wall 403, with the sample block held at a stable nominal temperature of 95° C.

FIG. 5 shows the modeling results without vertical wall 403. Temperature bands 501-509 correspond to the temperature ranges given in Table 1:

TABLE 1

| Band | Temperature Range ° C. |
|---|---|
| 501 | 94.91-95.12 |
| 502 | 94.71-94.91 |
| 503 | 94.50-94.71 |
| 504 | 94.30-94.50 |
| 505 | 94.09-94.30 |
| 506 | 93.89-94.09 |
| 507 | 93.68-93.89 |
| 508 | 93.48-93.68 |
| 509 | 93.27-93.48 |

At point 510, the modeled average temperature was 95.06° C., and at point 511, the modeled average temperature was 94.18° C., giving a temperature variation of 95.06-94.18=0.88° C.

FIG. 6 shows the modeling results with vertical wall 403. Temperature bands 601-609 correspond to the temperature ranges given in Table 2:

TABLE 2

| Band | Temperature Range ° C. |
|---|---|
| 601 | 95.14-95.33 |
| 602 | 94.94-95.14 |
| 603 | 94.75-94.94 |
| 604 | 94.55-94.75 |
| 605 | 94.36-94.55 |
| 606 | 94.16-94.36 |
| 607 | 93.97-94.16 |
| 608 | 93.77-93.97 |
| 609 | 93.58-93.77 |

At point 610, the modeled average temperature was 95.27° C., and at point 611, the modeled average temperature was 94.66° C., giving a temperature variation of 95.27-94.66=0.61° C.

Thus the modeling suggests that the temperature variation across sample block 401 may be reduced by about 30 percent, as compared with a sample block lacking vertical wall 403.

Figure 7:
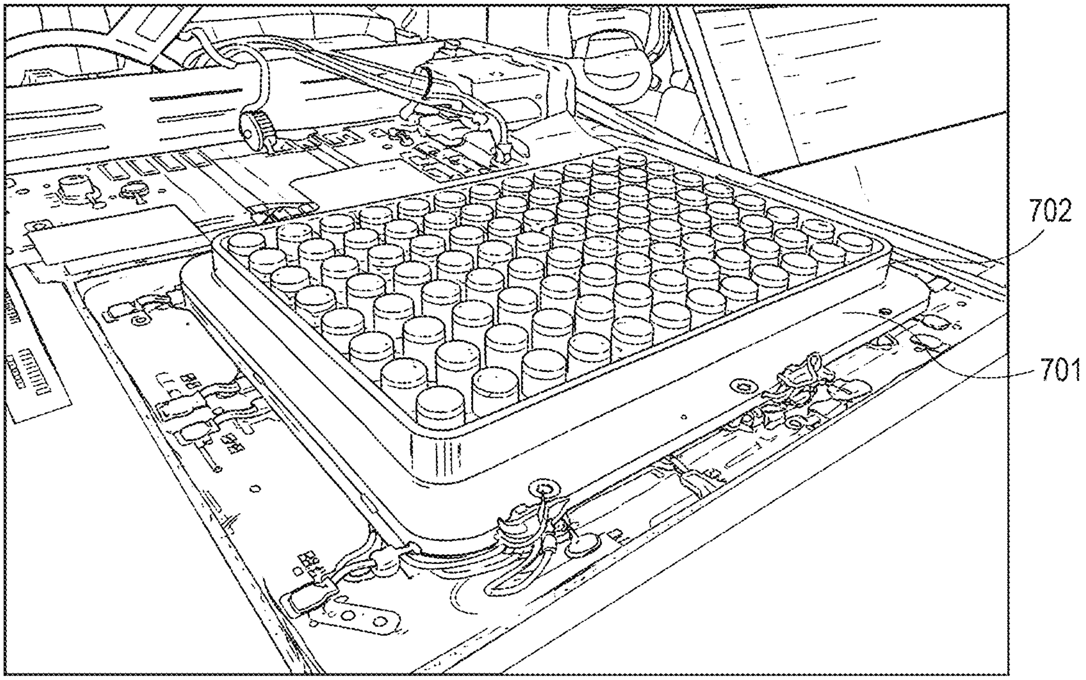
FIG. 7 shows an experimental sample block, constructed according to embodiments of the invention.
Figure 8:
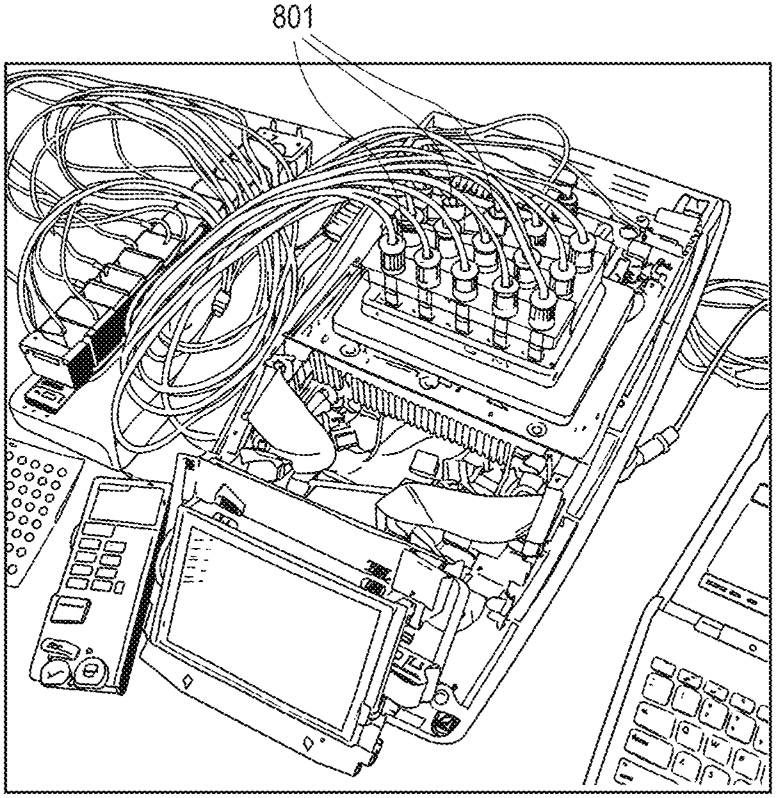
FIG. 8 shows a system for measuring the performance of sample blocks in accordance with embodiments of the invention.

For further verification, a prototype of a sample block having a vertical wall was constructed by forming the wall from sheet metal and bonding it with thermally-conductive adhesive to an existing sample block. The resulting sample block 701 is shown in FIG. 7, including vertical wall 702, in accordance with embodiments of the invention. Three sample blocks were tested as shown in FIG. 8, both with and without vertical walls. For the measurements, the experimental sample blocks were mounted in a modified Bio-Rad T100 Thermal Cycler, available from Bio-Rad, Inc., of Hercules, California, USA. As shown in FIG. 8, the temperatures of selected reaction vessels were measured using temperature probes 801. The resulting measurements showed a reduction in temperature variation of about 20 percent in sample blocks having vertical wall 702, as compared with sample blocks lacking a vertical wall. For a sample block lacking a vertical wall, a temperature variation of about 1.12° C. was measured, while for a sample block having a vertical wall, a temperature variation of about 0.9° C. was measured. The measurements were performed with the sample block held at a stable nominal temperature of 95° C.

Figure 9:
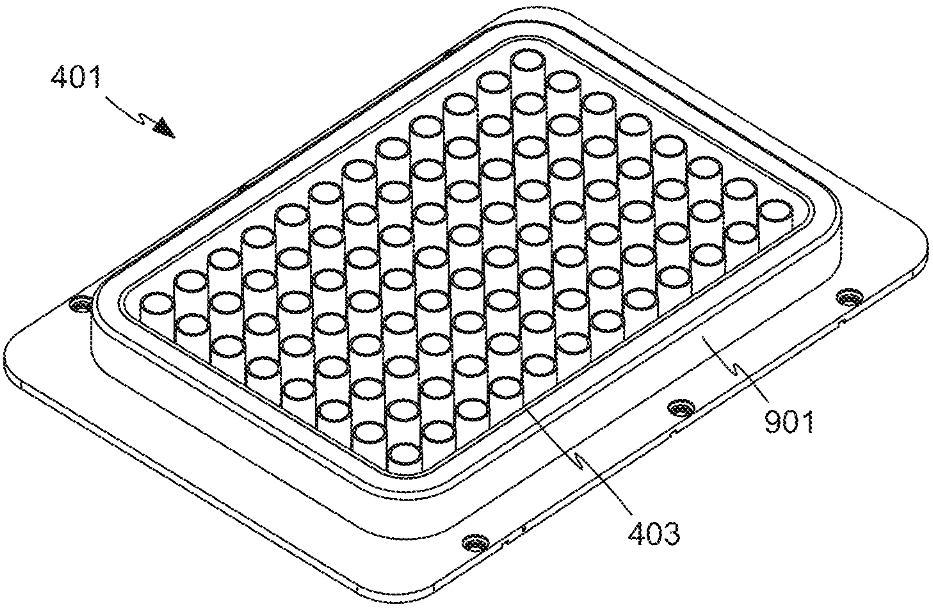
FIG. 9 illustrates the sample block of FIG. 4, with added insulation 901 in accordance with embodiments of the invention
Figure 10:
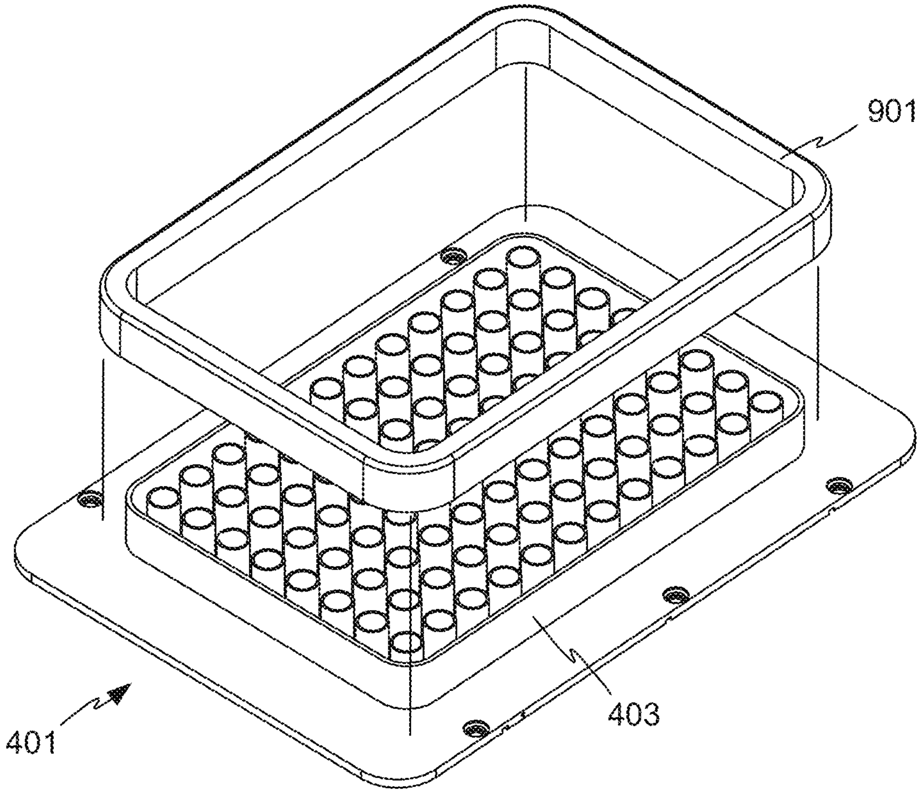
FIG. 10 shows an exploded view of the arrangement of FIG. 9.

In other embodiments, additional insulation may be provided on a sample block. For example, FIG. 9 illustrates sample block 401 including vertical wall 403, with added insulation 901, in accordance with embodiments of the invention. FIG. 10 shows an exploded view of sample block 401 and insulation 901.

Figure 11:
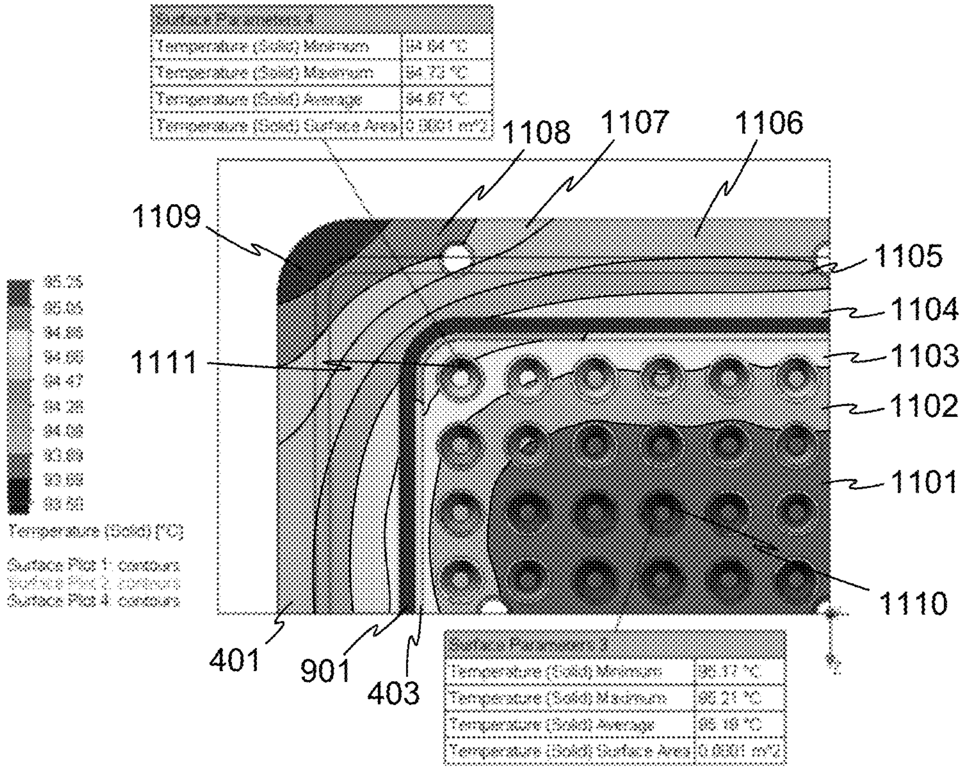
FIG. 11 shows the results of a thermal modeling analysis of the performance of a sample block with a vertical wall and added insulation, in accordance with embodiments of the invention.

FIG. 11 shows the results of a thermal modeling analysis of the performance of a sample block with a vertical wall and added insulation, in accordance with embodiments of the invention, with the sample block held at a stable nominal temperature of 95° C. Insulation 901 may be made of any suitable material, for example a polymer such as polycarbonate or ABS or a blend of polymers. Insulation 901 may be a solid material, or may include voids. Insulation 901 may be rigid or flexible. For example, insulation 901 may be a foam material such as polyurethane or polyisocyanurate foam. For modeling purposes, insulation 901 was assumed to be in good thermal contact with vertical wall 403, and was assigned a thermal conductivity of 0.2 W/m-K, similar to the properties of polycarbonate. Temperature bands 1101-1109 shown in FIG. 11 correspond to the temperature ranges given in Table 3:

TABLE 3

| Band | Temperature Range ° C. |
|---|---|
| 1101 | 95.05-95.25 |
| 1102 | 94.86-95.05 |
| 1103 | 94.66-94.86 |
| 1104 | 94.47-94.66 |
| 1105 | 94.28-94.47 |
| 1106 | 94.08-94.28 |
| 1107 | 93.89-94.08 |
| 1108 | 93.69-93.89 |
| 1109 | 93.50-93.69 |

At point 1110, the modeled average temperature was 95.19° C., and at point 1111, the modeled average temperature was 94.67° C., giving a temperature variation of 95.19-94.67=0.52° C.

Thus the modeling suggests that the temperature variation across sample block 401 with added insulation 901 may be reduced by about 40 percent, as compared with a sample block lacking vertical wall 403 and lacking added insulation 901 (100×(1−0.52/0.88)=40.9), and by about 15 percent as compared to sample block 401 with vertical wall 403 but without added insulation (100×(1−0.52/0.61)=14.75).

Figure 12:
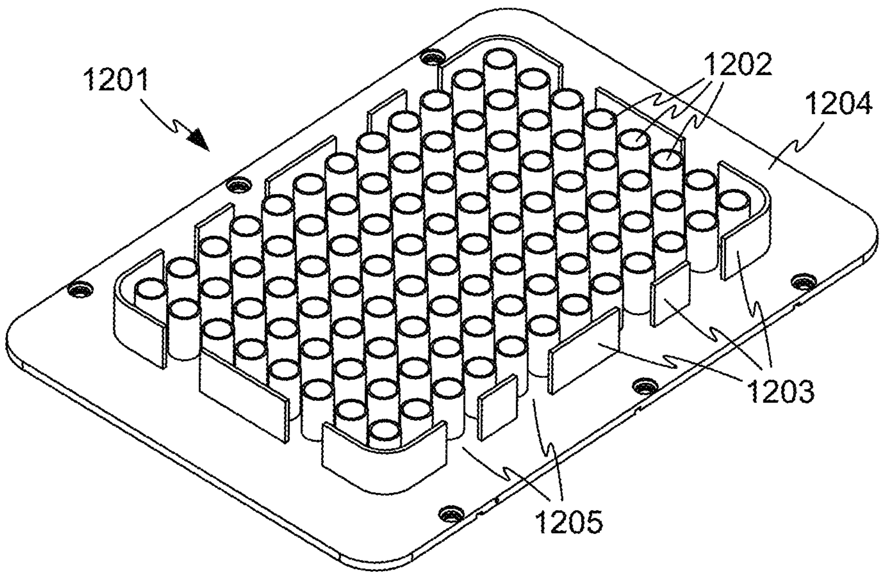
FIG. 12 shows a sample block in accordance with other embodiments of the invention.

Other variations are possible in sample blocks embodying the invention. For example, FIG. 12 illustrates a sample block 1201, in accordance with other embodiments. Sample block 1201 is similar to sample block 401 described above, in that it includes a number of reaction vessels 1202 extending upward from a base plate 1204. However, rather than having a continuous vertical wall, reaction vessels 1202 are surrounded by an intermittent vertical wall 1203, having gaps 1205 (only some of which are labeled). The number and sizes of gaps 1205 may vary from the example shown in FIG. 12.

Such a wall may reduce the mass of sample plate 1201, as compared with sample plate 401. The reduction in mass may be beneficial in that the lower mass requires less power for heating and cooling, and therefore a PCR thermal cycler including sample plate 1201 may be able to cycle the temperature of the reaction vessels more quickly, reducing the amount of time required to complete a PCR procedure. Alternatively, the lower mass may enable the use of lower power thermoelectric devices to without sacrificing cycling speed, as compared with using a sample plate with a continuous wall.

Figure 13:
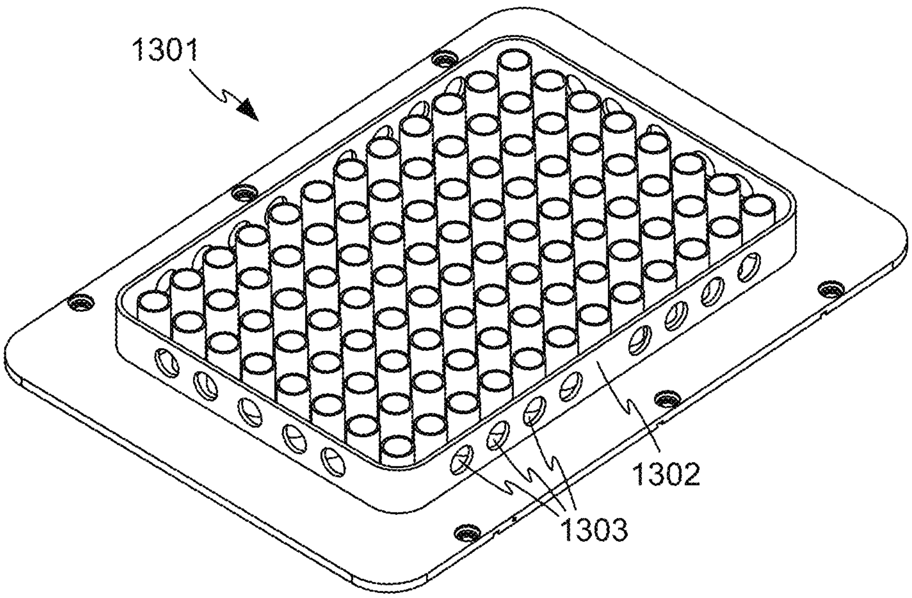
FIG. 13 shows a sample block in accordance with other embodiments of the invention.

Other ways of reducing the mass of a sample plate are possible, in accordance with other embodiments of the invention. For example, FIG. 13 illustrates a sample plate 1301, in which vertical wall 1302 has been perforated with holes 1303. The number, size, and distribution of holes 1303 may be varied.

Figure 14:
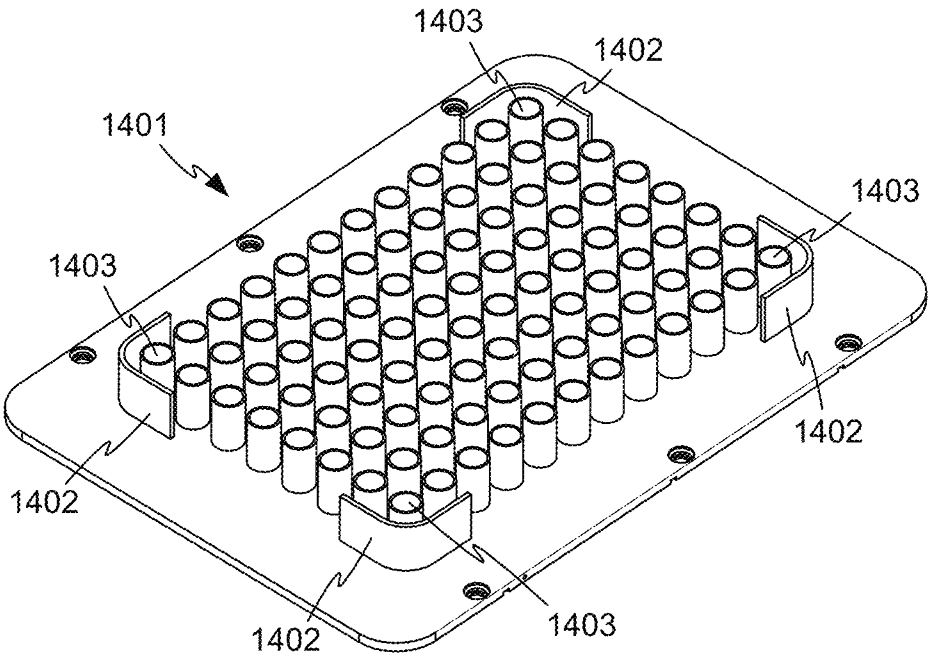
FIG. 14 shows a sample block in accordance with other embodiments of the invention.

In another example, FIG. 14 illustrates a sample plate 1401, having vertical walls 1402 only at the corners, near corner reaction vessels 1403. The corner reaction vessels 1403 may tend to have the most extreme temperature variations, and therefore placing walls 1402 only at the corners addresses temperature uniformity where improvement may be most needed, while adding relatively little to the mass of sample plate 1401.

Many other mass-reducing techniques are possible, for example varying the height or thickness of the vertical wall.

A sample plate in accordance with embodiments of the invention may be incorporated into a thermal cycler device otherwise similar to thermal cycler 100 as described above, or may be used in other applications.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents. It is to be understood that any workable combination of the features and capabilities disclosed herein is also considered to be disclosed.

What is claimed is:

1. A sample plate for a thermal cycler, the sample plate comprising:

a base plate;

a plurality of reaction vessels extending upward from the base plate, the reaction vessels defining an outer perimeter; and a vertical wall attached to the base plate and extending upward from the base plate and surrounding the reaction vessels, wherein the vertical wall is spaced from the outer perimeter of the reaction vessels to form an air gap therebetween, and wherein the air gap has a predetermined lateral width defined by an inner surface of the vertical wall and the outer perimeter of the reaction vessels, wherein the vertical wall and the air gap control temperature variation at perimeter reaction vessels of the plurality of reaction vessels to maintain thermal uniformity across the plurality of reaction vessels during a thermal cycle.

2. The sample plate of claim 1, wherein the sample plate is monolithic.

3. The sample plate of claim 2, wherein the sample plate comprises aluminum.

4. The sample plate of claim 3, further comprising thermal insulation surrounding and in contact with the vertical wall.

5. The sample plate of claim 4, wherein the thermal insulation comprises a polymer.

6. The sample plate of claim 1, wherein the vertical wall has a same height as the reaction vessels.

7. The sample plate of claim 1, wherein the vertical wall is continuous.

8. The sample plate of claim 1, wherein the vertical wall is intermittent.

9. The sample plate of claim 8, wherein the intermittent vertical wall comprises a plurality of wall portions separated by a plurality of gaps.

10. The sample plate of claim 8, wherein the reaction vessels are arranged to create a plurality of corners, and wherein a wall portion of the vertical wall extends around each of the plurality of corners.

11. The sample plate of claim 1, wherein the vertical wall is perforated.

12. The sample plate of claim 11, wherein the reaction vessels are arranged to create a plurality of corners, and wherein the perforations are located away from the corners.

13. A thermal cycling device for performing a polymerase chain reaction (PCR) procedure, the thermal cycling device comprising:

a heat sink;

one or more thermoelectric devices configured to produce a temperature differential in response to electric currents passing through the thermoelectric devices, wherein the one or more thermoelectric devices are in thermal contact with the heat sink; and a sample plate in thermal contact with the one or more thermoelectric devices, wherein the sample plate comprises a base plate; a plurality of reaction vessels extending upward from the base plate, the reaction vessels defining an outer perimeter; and a vertical wall extending upward from the base plate and surrounding the outer perimeter of the reaction vessels, wherein the vertical wall is spaced from the outer perimeter of the reaction vessels to form an air gap therebetween, and wherein the air gap has a predetermined lateral width defined by an inner surface of the vertical wall and the outer perimeter of the reaction vessels, wherein the vertical wall and the air gap control temperature variation at perimeter reaction vessels of the plurality of reaction vessels to maintain thermal uniformity across the plurality of reaction vessels during a thermal cycle.

14. The thermal cycling device of claim 13, further comprising a controller configured to cycle the temperature of the reaction vessels according to a predetermined schedule, by controlling the electric currents passing through the thermoelectric devices.

15. The thermal cycling device of claim 14, further comprising a base that houses the heat sink.

16. The thermal cycling device of claim 15, further comprising a lid that is openable and closeable to provide access to the reaction vessels.

17. The thermal cycling device of claim 16, wherein the lid is heated during a PCR procedure.

18. The thermal cycling device of claim 17, wherein when the thermoelectric devices are controlled to maintain the sample plate at a nominal temperature of 95° C., a variation of temperature between the reaction vessels of the sample plate is less than 1° C.

19. A method, comprising:

providing a PCR thermal cycler device as in claim 6;

receiving a reagent mixture into the reaction vessels; and controlling a thermoelectric devices to bring the sample plate to a nominal temperature of 95° C., wherein when the sample block is held at a nominal temperature of 95° C., a variation of temperature between the reaction vessels of the sample plate reaches a value of less than 1° C.

20. The method of claim 19, further comprising controlling the thermoelectric devices as needed to cycle the temperature of the sample block in accordance with a PCR procedure.

21. The sample plate of claim 1, wherein the vertical wall is positioned at least 3 mm away from the outer perimeter of the reaction vessels, and wherein the vertical wall is 0.5 to 3.0 mm thick.

* * * * *